United States Patent
Shaked et al.

(10) Patent No.: US 9,843,349 B2
(45) Date of Patent: *Dec. 12, 2017

(54) SYSTEM AND METHOD FOR FREQUENCY REUSE FOR WIRELESS POINT-TO-POINT BACKHAUL

(71) Applicant: Maxlinear Asia Singapore PTE LTD, Singapore (SG)

(72) Inventors: Ronen Shaked, Kfar-Saba (IL); Ilan Reingold, Givataim (IL); Eitan Tsur, Rishon Lezion (IL); Eran Ridel, Rosh Ha'aiyn (IL)

(73) Assignee: Maxlinear Asia Singapore PTE LTD (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,090

(22) Filed: Aug. 31, 2016

(65) Prior Publication Data

US 2017/0033819 A1 Feb. 2, 2017

Related U.S. Application Data

(63) Continuation of application No. 14/588,358, filed on Dec. 31, 2014, now Pat. No. 9,444,505.

(60) Provisional application No. 61/978,376, filed on Apr. 11, 2014.

(51) Int. Cl.
| | |
|---|---|
| H04B 1/06 | (2006.01) |
| H04B 1/12 | (2006.01) |
| H04B 7/08 | (2006.01) |
| H04L 1/00 | (2006.01) |
| H04B 1/18 | (2006.01) |

(52) U.S. Cl.
CPC ........... H04B 1/126 (2013.01); H04B 7/0854 (2013.01); H04L 1/0054 (2013.01)

(58) Field of Classification Search
CPC ........... H04B 1/12; H04B 1/123; H04B 1/126
USPC .......................................... 455/276.1, 278.1
See application file for complete search history.

(56) References Cited

U.S. PATENT DOCUMENTS 9,444,505 B2 * 9/2016 Shaked .................. H04B 1/126

* cited by examiner

*Primary Examiner* — Lee Nguyen
(74) *Attorney, Agent, or Firm* — McAndrews, Held & Malloy, Ltd.

(57) ABSTRACT

A system and method for frequency reuse for wireless point-to-point backhaul. Frequency reuse is enabled through the cancellation of interfering signals generated by interference sources. In one embodiment, a conventional dish antenna is complemented with one or more additional auxiliary antennas (e.g., isotropic). The one or more additional auxiliary antennas enable cancellation of interfering signals whose direction of arrival (DOA) is off the dish antenna's bore-sight.

20 Claims, 9 Drawing Sheets

SYSTEM AND METHOD FOR FREQUENCY REUSE FOR WIRELESS POINT-TO-POINT BACKHAUL

This application is a continuation of U.S. patent application Ser. No. 14/588,358, filed Dec. 31, 2014 and claims the benefit of and priority to U.S. Provisional Application No. 61/978,376, filed Apr. 11, 2014, which is incorporated herein by reference in its entirety.

BACKGROUND

Field

The present disclosure relates generally to microwave backhaul architecture and, more particularly, to a system and method for frequency reuse for wireless point-to-point backhaul.

Introduction

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a single channel coaxial interconnect. The IDU in a conventional split ODU configuration typically includes a modem, a digital-to-analog converter and a baseband-to-intermediate frequency converter.

Mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Figure 1:
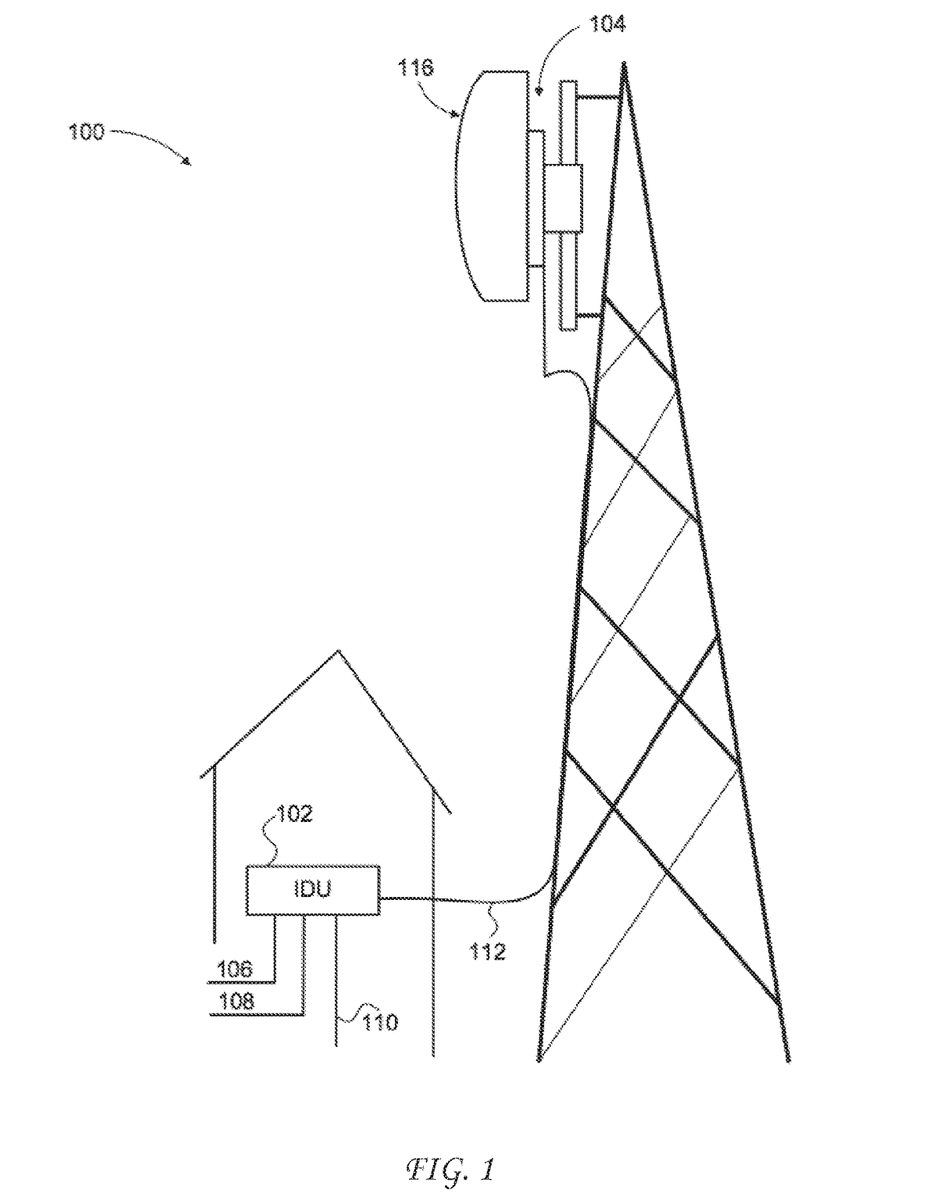
FIG. 1 illustrates a block diagram of a microwave backhaul system according to an exemplary embodiment.

It is recognized that the microwave backhaul world is growing due to increased bandwidth demands. FIG. 1 illustrates a block diagram of an example microwave backhaul system 100 that includes IDU 102 and ODU 104. Microwave, as used throughout this disclosure, refers to both terrestrial point-to-point (PtP) radio communications, as well as point-to-multipoint communications, and can include both wired and/or wireless communications.

Microwave backhaul system 100 initiates communication by accessing an information source, which can comprise, for example, audio data 106, video data 108, or any other data capable of being transmitted over an Internet Protocol (IP)/Ethernet connection 110. To facilitate this communication, IDU 102 can be coupled to a core network. In particular, IDU 102 can be configured to acquire one or more sequences of digital data (e.g., audio data 106, video data 108, data transmitted over IP/Ethernet connection 110, or the like) from the core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or other structure. Conversely, ODU 104 can be implemented at a substantially elevated location, such as on top of a pole, on top of an antenna tower, on top of a building, or other mounted location. In some embodiments, IDU 102 and ODU 104 can be separated by a significant distance (e.g., up to approximately 300 meters). In general, IDU 102 includes a modem assembly, while ODU 104 includes at least some RF functionalities as well as corresponding digital capabilities.

IDU 102 and ODU 104 can be connected via communication pathway 112, which can be configured such that data can be transmitted between IDU 102 and ODU 104. In various examples, communication pathway 112 can comprise a twisted pair Ethernet cable, a fiber optic cable, a coaxial cable, an intermediate frequency (IF) cable, or any other cable suitable for IDU-ODU communication. Therefore, depending on a chosen communication medium, communication pathway 112 can facilitate transmission of an analog signal or a digital signal between IDU 102 and ODU 104. In some embodiments, communication pathway 112 can be a wireless communication channel.

Antenna 116 can be coupled to ODU 104, and can be positioned close to ODU 104. Therefore, microwave backhaul system 100 can be implemented such that data can be transmitted from IDU 102, across communication pathway 112, to ODU 104, and subsequently to antenna 116 where communication over a wireless link can then be initiated. Also, microwave backhaul system 100 can be implemented such that data received by antenna 116 can be transmitted from ODU 104 over communication pathway 112 to IDU 102.

Figure 2A:
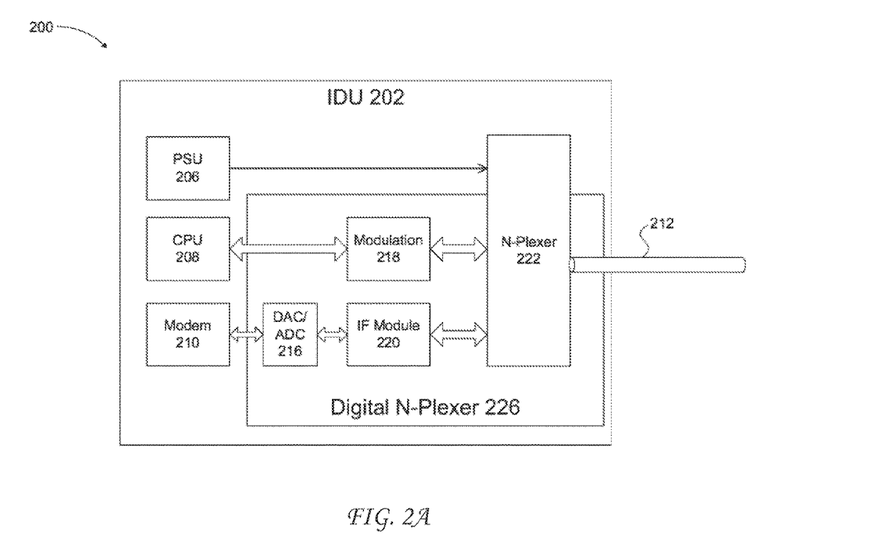
FIG. 2A illustrates a high-level block diagram of an IDU for implementation within a microwave backhaul system according to an exemplary embodiment.
Figure 2B:
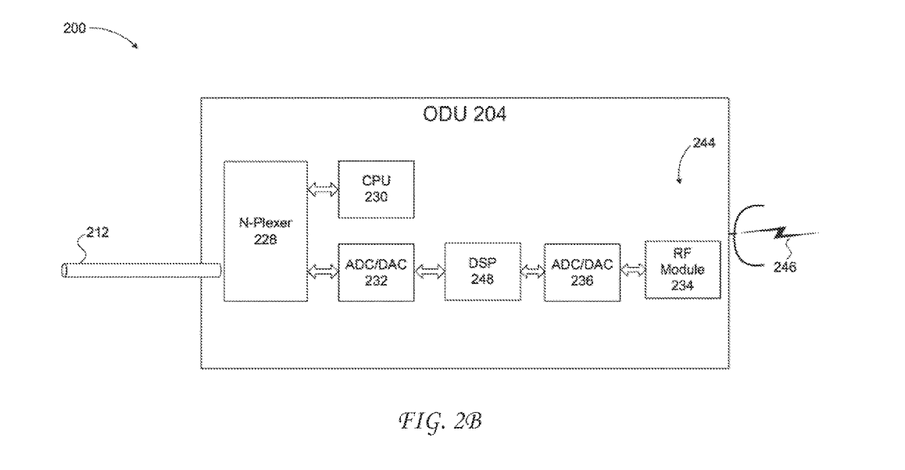
FIG. 2B illustrates a high-level block diagram of an ODU for implementation within a microwave backhaul system according to an exemplary embodiment.

In one embodiment, ODU 104 can correct errors associated with a signal received over a wireless link via antenna 116. Microwave backhaul system 100 can also be configured to support adaptive coding and modulation (ACM), which provides high reliability of microwave backhaul system 100 even in extreme weather, such as wind, rain, hail, or other interfering environmental conditions. For example, ACM can adapt coding and modulation rates to changing environmental conditions to thereby increase throughput over a link and make efficient use of the existing spectrum. Thus, ACM enables the ODU to hitlessly manage the transitions when adjusting the number of transmission/receipt channels based on the changes in the communication channel FIGS. 2A and 2B illustrate high-level block diagrams of an example IDU and ODU, respectively, for use within a microwave backhaul system according to an exemplary embodiment. IDU 202 and ODU 204 are coupled together via communication pathway 212. IDU 202 can represent an exemplary embodiment of IDU 102 of FIG. 1, and ODU 204 can represent an exemplary embodiment of ODU 104 of FIG. 1.

IDU 202 includes a power supply unit (PSU) 206, a CPU 208, a modem assembly 210, a digital-to-analog converter/analog-to-digital converter (DAC/ADC) block 216, a modulation block 218, and an intermediate frequency (IF) module 220. In some embodiments, IDU 202 can also include an N-Plexer 222. CPU 208 is configured to carry out instructions to perform arithmetical, logical, and/or input/output (I/O) operations of one or more of the aforementioned elements contained within IDU 202. In an embodiment, CPU 208 can control operation of modulation block 218 and N-Plexer 222.

Modem assembly 210 is configured to perform modulation and demodulation of data that is to be transmitted between IDU 202 and ODU 204. In some embodiments, modem assembly 210 can function substantially similar to a baseband modem. Further, modem assembly 210 can be configured to cancel out noise associated with IDU 202 or communication pathway 212. DAC/ADC block 216 can be configured to transmit and/or receive data from modem assembly 210. DAC/ADC block 216 is also configured to perform digital-to-analog and/or analog-to-digital conversions of data such that the data is suitable for transmission over communication pathway 212.

Modulation block 218 can also be configured to perform various modulation and/or demodulation techniques. In an embodiment, modulation block 218 can be configured to perform amplitude-shift keying. For example, modulation block 218 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 218 is configured to perform demodulation, modulation block 218 determines the amplitude of the received signal and maps it back to the symbol it represents, thus recovering the original data.

IF module 220 can be configured to transmit and/or receive data from DAC/ADC block 216. IF module 220 is also configured to perform a frequency conversion of the received data such that data is suitable for transmission over communication pathway 212. For example, IF module 220 can be configured to convert data from a baseband frequency to an IF.

N-Plexer 222 can be configured to permit N-directional communication over communication pathway 212. In particular, N-Plexer 222 is configured to isolate IDU 202 from ODU 204, while permitting them to share a common antenna. N-Plexer 222 is also configured to receive a control signal (e.g. a Telemetry ASK signal) output from modulation block 218, and to receive an IF signal output from IF module 220. Additionally, N-Plexer 222 can be configured to convert and/or combine each of these inputs to form data. N-Plexer 222 is also configured to transmit and/or receive data, over communication pathway 212, between IDU 202 and ODU 204. In an embodiment, N-Plexer 222 can function substantially as an analog duplexer (multiplexer/demultiplexer). In one embodiment, communication pathway 212 can be embodied as one or more IF cables that can facilitate quadruple channel communication with one or more IDUs.

In an exemplary embodiment, DAC/ADC block 216, modulation block 218, IF module 220 and N-Plexer 222 can be replaced by Digital N-Plexer 226. In particular, Digital N-Plexer 226 can be configured to multiplex/demultiplex the required signal in the digital domain, rather than in the analog domain. Subsequently, Digital N-Plexer 226 can allow communication pathway 212 to be implemented as either a digital pathway or an analog pathway. Using Digital N-Plexer 226 allows for a simpler implementation of IDU 202. For example, when implementing IDU 202 having Digital N-Plexer 226, no analog functionality would be required, and instead only a single digital chip substrate would be needed. As a result, the cost of implementing IDU 202 can be decreased. Additionally, using a Digital N-Plexer 226 can provide an improved yield, shorter production testing, lower assembly cost, lower peripheral component count, and can support greater distances between IDU 202 and ODU 204, to provide some examples.

As illustrated in FIG. 2B, ODU 204 can also include an N-Plexer 228, which can be implemented in several different manners. For example, N-Plexer 228 can be an analog N-Plexer, a digital N-Plexer, or a split function N-Plexer (e.g., where N-Plexer 228 is partially analog and partially digital). When N-Plexer 228 represents a digital N-Plexer, N-Plexer 228 can function in a substantially similar manner as Digital N-Plexer 226. In particular, N-Plexer 228 can be configured to multiplex/demultiplex signals in the digital domain. N-Plexer 228 also allows for a simpler implementation of ODU 204 because no analog functionality would be required, and instead only a single digital chip substrate would need to be implemented within ODU 204. Therefore, the cost of implementing ODU 204 can also be decreased. Similar to Digital N-Plexer 226, implementing N-Plexer 228 within ODU 204 can provide an improved yield, shorter production testing, lower assembly cost, lower peripheral component count, and can support greater distances between IDU 202 and ODU 204, to provide some examples.

In an embodiment, IDU 202 and ODU 204 can be configured to perform an N-Plexer elimination technique. In particular, the functionality directed towards filtering RX, after being received over communication pathway 212, and TX, before being transmitted over communication pathway 212, can be removed from N-Plexers 226 and 228. Instead, this functionality can be implemented within the digital chip substrate (e.g., integrated circuit) that comprises IDU 202 and the digital chip substrate (e.g., integrated circuit) that comprises ODU 204. IDU 202 and ODU 204 can then filter the required signals through any combination of an analog filtering process, a signal sampling process and/or a digital filtering process.

ODU 204 can also include CPU 230, ADC/DAC blocks 232 and 236, digital signal processor (DSP) 248, and RF module 234. CPU 230 can be configured to function in a substantially similar manner as CPU 208. In particular, CPU 230 can be configured to carry out instructions to perform arithmetical, logical, and/or I/O operations of one or more of the elements contained within ODU 204. In an embodiment, CPU 208 can control operation of N-Plexer 228. ADC/DAC block 232 can be configured to transmit and/or receive data from N-Plexer 228. ADC/DAC blocks 232 and 236 are also configured to perform analog-to-digital and/or digital-to-analog conversions of data such that data can be properly transmitted and/or received over communication pathway 212. Further, DSP 248 can be configured to perform mathematical manipulation techniques on data, such that data may be modified or improved according to a desired processing method. For example, DSP 248 can be configured to measure, filter, or compress data prior to being output to ADC/DAC block 236, such that error detection and/or error correction can be performed on the data. In an embodiment, after the data is received, over communication pathway 212, at ODU 204, the data traverses through N-Plexer 228, to ADC/DAC block 232, to DSP 248, to ADC/DAC block 236, to RF module 234 and to antenna 244 before being transmitted across wireless link 246. Similarly, after data is received over wireless link 246, at ODU 204, data traverses from antenna 244 to RF module 234, to ADC/DAC block 236, to DSP 248, to ADC/DAC block 232, and to N-Plexer 228 before being transmitted over communication pathway 212. As will be described in greater detail below, DSP 248 can also be configured to remove the effect of interference signals from one or more interfering sources that are present in the received signals output by antenna 244.

RF module 234 can be configured to transmit and/or receive data from ADC/DAC block 236. RF module 234 can also be configured to perform a frequency conversion of data such that data can be properly received over communication pathway 212. For example, when data is received at RF module 234, data can have a frequency residing in the IF range. Therefore, RF module 234 can up-convert data from an IF to a RF such that data can then be transmitted over wireless link 246. RF module 234 can also be configured to down-convert a signal received over the wireless link from a RF to an IF such that the received signal can be transmitted over communication pathway 212 to IDU 202.

The deployment process of backhaul links by operators is typically governed by the state regulator, often obligating the operators to acquire several frequency bands to guarantee interference-free operation of the multiple backhaul links. In the present disclosure, it is recognized that reducing the associated cost of holding multiple frequency bands to cover a certain region is desirable.

Figure 3:
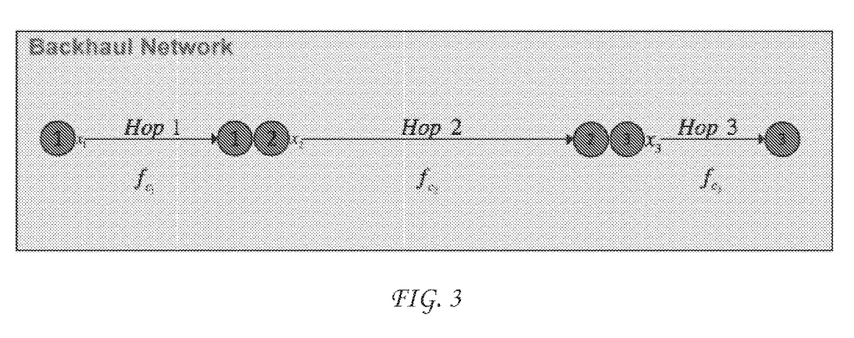
FIG. 3 illustrates an example backhaul scenario of a straight-line, multi-hop backhaul link.

Typically, a straight-line, multi-hop backhaul link includes no more than 2-3 hops, before the straight line breaks. FIG. 3 illustrates an example backhaul scenario of a straight-line, multi-hop backhaul link. As illustrated, such a link includes three hops, wherein each of the hops uses a different frequency band $f_{c1}$, $f_{c2}$, $f_{c3}$ to assure no inter-hop interference.

In the present disclosure, a solution is presented that enables reuse of the same single channel over and over in a plurality of backhaul links in the network. Frequency reuse is enabled through the cancellation of interfering signals generated by interference sources. In one embodiment, a conventional dish antenna is complemented with one or more additional auxiliary antennas (e.g., isotropic). Here, the one or more additional auxiliary antennas enable cancellation of interfering signals whose direction of arrival (DOA) is off the dish antenna's bore-sight.

The dish antenna output signal includes the highly-amplified desired signal summed with an undesired interference signal arriving off bore-sight but with a lower gain (e.g., −35 dBc) compared to the desired signal. This is due to the side-lobes gain of the dish antenna. In the example, this results with a limiting SNR of 35 dB. To avoid this interference in microwave backhaul links, regulators typically obligate use of different frequency bands, thereby driving up costs for the operators.

An auxiliary omni-directional antenna output signal includes an equal gain summation of the desired signal and the interference signal. In the present disclosure, it is recognized that by pre-adjusting the gain of this signal followed by a subtraction from the dish antenna's output, the interference signal is cancelled with a small gain penalty in the desired signal. In general, output signals are down-converted to baseband such that a digital circuit is then able to remove the interfering signals and extract only the desired signal.

Figure 4:
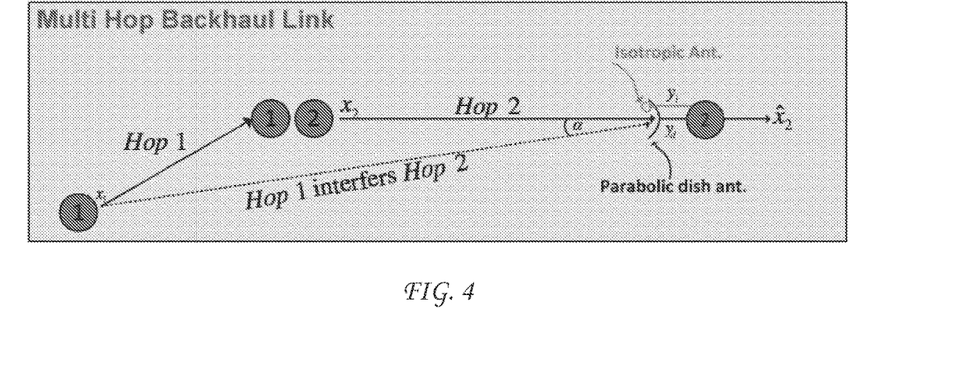
FIG. 4 illustrates an example multi-hop backhaul link.
Figure 5:
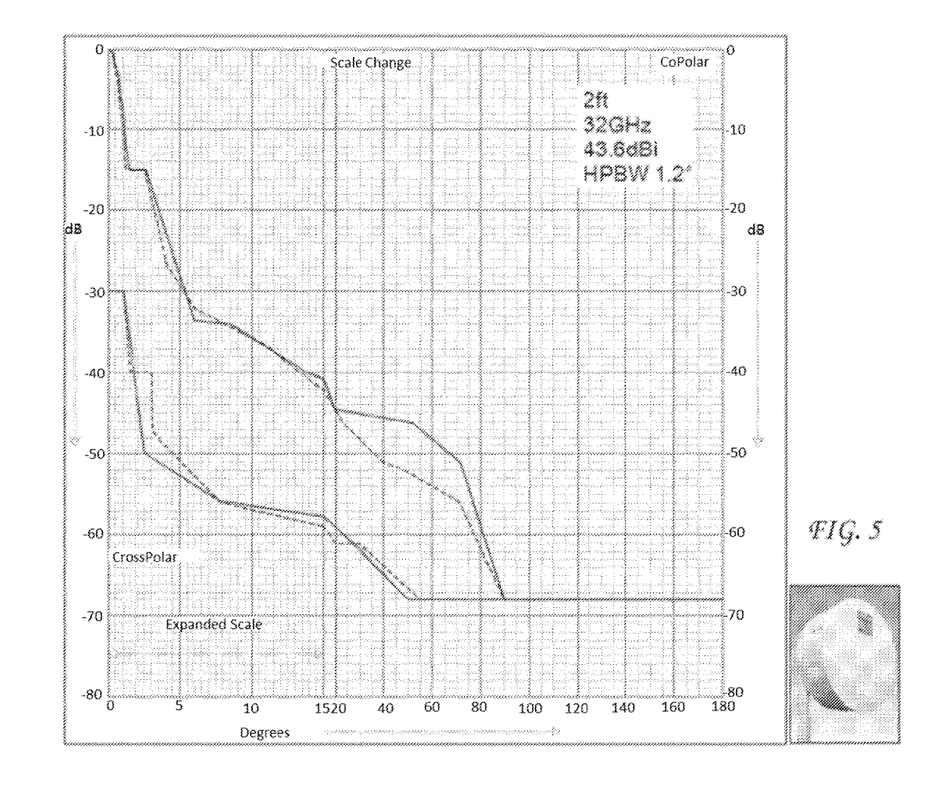
FIG. 5 illustrates an example of a directional dish antenna.

To illustrate this concept, reference is made to the example multi-hop backhaul link illustrated in FIG. 4. As illustrated, the interfering signal's DOA into Hop 2's receive antenna is at an angle α off the bore-sight. The dish antenna has a radiation pattern denoted as $U_d(\theta)$ and the isotropic antenna radiation pattern is denoted by $U_i(\theta)$. By definition, the omni-directional nature of the isotropic antenna dictates that the isotropic antenna radiation pattern is a constant for all angles (at least in 2D). The dish antenna, on the other hand, has a radiation pattern that is angle-selective. In other words, there is high gain in the narrow few degrees of the bore-sight beam, with significant but not satisfactory side-lobes response. FIG. 5 illustrates an example performance of a directional dish antenna.

Figure 6:
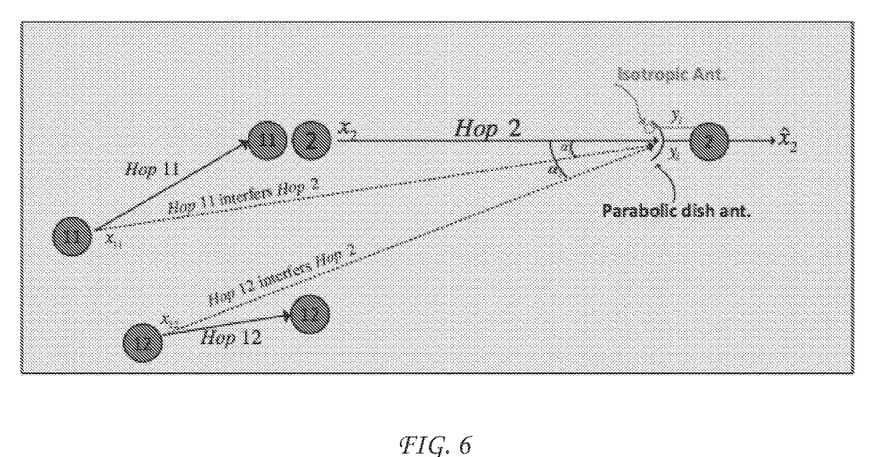
FIG. 6 illustrates an example backhaul link with two interferers.

To illustrate an interference cancellation mechanism that enables frequency reuse, reference is now made to FIG. 6, which illustrates an example backhaul link with two interferers. In this example, the antenna configuration again includes a parabolic dish antenna complemented by one isotropic antenna. The output of the parabolic dish antenna is $y_d$, while the output of the isotropic antenna is $y_i$. Here, it should be noted that more than one isotropic antenna can be used in different embodiments to address one or more interference sources that can exist in a given installation scenario.

In the example of FIG. 6, the received signals at the parabolic dish antenna and the isotropic antenna can be described as follows:

$$\underline{y} = \begin{bmatrix} y_d \\ y_i \end{bmatrix} = \begin{bmatrix} G_d(\alpha_1)A & G_d(\alpha_2)A & G_d(0) \\ G_i(\alpha_1)A & G_i(\alpha_2)A & G_i(0) \end{bmatrix} \begin{bmatrix} x_{11} \\ x_{12} \\ x_2 \end{bmatrix} + \begin{bmatrix} n_1 \\ n_2 \end{bmatrix} \triangleq H \cdot \underline{x} + \underline{n}$$

where $x_{11}$, $x_{12}$, and $x_2$ are the independent transmitted signals over Hop 11, Hop 12, and Hop 2, respectively, $n_1$, $n_2$ are the independent additive white Gaussian noise (AWGN) at the respective antennas, and H is the channel describing this system. $20 \log_{10} A$ [dB] is the interferers power above the desired signal (e.g., $20 \log_{10} A = 30$ dBc), i.e., both interferers transmit power is the same.

$$E|n_{1,2}|^2 = \sigma^2, E|x_{1,2}|^2 = 1, SNR_{planned} = \frac{1 \cdot (G_d(0))^2}{\sigma^2}$$

is the planned link SNR in the desired link (e.g., 40 dB) if no interferers were present (i.e., no frequency reuse). $20 \log_{10} G_d(0)$ [dBi] is the dish antenna gain at bore-sight (e.g., 43.6 dBi for a typical microwave antenna). $20 \log_{10} G_d(\alpha)$ [dBi] is the dish antenna gain at DOA $\alpha$. $20 \log_{10} G_i(0)$ [dBi] is the isotropic antenna gain at bore-sight. $20 \log_{10} G_i(\alpha_{1,2})$ [dBi] is the isotropic antenna gain at DOA $\alpha_{1,2}$. If the interferer transmitters ($x_{11}$, $x_{12}$) are located at the same height of the desired signal transmitter ($x_2$) then the latter two terms ($20 \log_{10} G_i(0)$ and $20 \log_{10} G_i(\alpha_{1,2})$) are of equal gain value, since the omni-directional antenna has an equal gain over horizontal rotation.

The appropriate Linear Minimum Mean Square Equalizer (LMMSE) solution that can be determined by the signal processing module is then:

$$\hat{\underline{x}} = H'(HH' + \sigma^2 I)^{-1} \underline{y} \triangleq C \cdot \underline{y} = C \cdot (H\underline{x} + \underline{n}) = CH\underline{x} + C\underline{n}$$

In one example, the signal processing module is embodied as DSP 248. The LMMSE solution can be described as a fixed solution as it can be assumed that the channel H is known. In another embodiment, the signal processing module H is unknown and can be estimated. For example, a Least Mean Square (LMS) solution can provide an adaptive way of implementing LMMSE by estimating H. Here, the LMS solution would attempt to minimize error over time by updating and improving the estimation of H, and hence C. Note that in other embodiments, other solutions can be based on Minimum Mean Square Equalizer or Maximum Likelihood.

Further note that out of the two forms of the LMMSE solutions (both are identical as long as $\sigma^2 \neq 0$):

$$H^+(HH^+ + \sigma^2 I)^{-1} \text{ and} (H^+ H + \sigma^2 I)^{-1} H^+$$

In one embodiment, the chosen one is the former one, which achieves better numerical accuracy for under-determinant systems (and especially for high planned SNR), that is too few measurements in conjunction with too much signals—as is the case here. And specifically for the desired signal:

$$\hat{x}_2 = \underbrace{(CH)_{(3,3)} x_2}_{signal} + \underbrace{(CH)_{(3,1)} x_{11} + (CH)_{(3,2)} x_{12}}_{res.\ interferences} + \underbrace{(C)_{(3,1)} n_1 + (C)_{(3,2)} n_2}_{noise}$$

Therefore the resultant SINR is:

$$SINR_{dish+isotropic} = \frac{|(CH)_{(3,3)}|^2 \cdot 1}{|(CH)_{(3,1)}|^2 \cdot 1 + |(CH)_{(3,2)}|^2 \cdot 1 + \sigma^2 [|(C)_{(3,1)}|^2 + |(C)_{(3,2)}|^2]}$$

If the isotropic (omni-directional) antenna is not used then only the dish antenna's output is available:

$$y_d = [G_d(\alpha_1) \cdot A \quad G_d(\alpha_2) \cdot A \quad G_d(0)] \begin{bmatrix} x_{11} \\ x_{12} \\ x_2 \end{bmatrix} + n_1 =$$

$$G_d(0) x_2 + G_d(\alpha_1) \cdot A x_{11} + G_d(\alpha_2) \cdot A x_{12} + n_1$$

The LMMSE solution for this case, C, is a multiplying scalar and as such it preserves the SINR at its input (output SINR equals to input SINR).

$$SINR_{dish.only} = \frac{C^2}{C^2} \frac{(G_d(0))^2}{(G_d(\alpha_1) \cdot A)^2 + (G_d(\alpha_2) \cdot A)^2 + \sigma^2} =$$

-continued $$\frac{(G_d(0))^2}{(G_d(\alpha_1) \cdot A)^2 + (G_d(\alpha_2) \cdot A)^2 + \sigma^2}$$

Again the SNR gain will actually be a negative number (i.e., it will be a penalty) is:

$$SNRGain_{dish+isotropic} = \frac{SNR_{dish+isotropic}}{SNR_{planned}}$$

$$SNRGain_{dish.only} = \frac{SINR_{dish+isotropic}}{SNR_{planned}}$$

Figure 7:
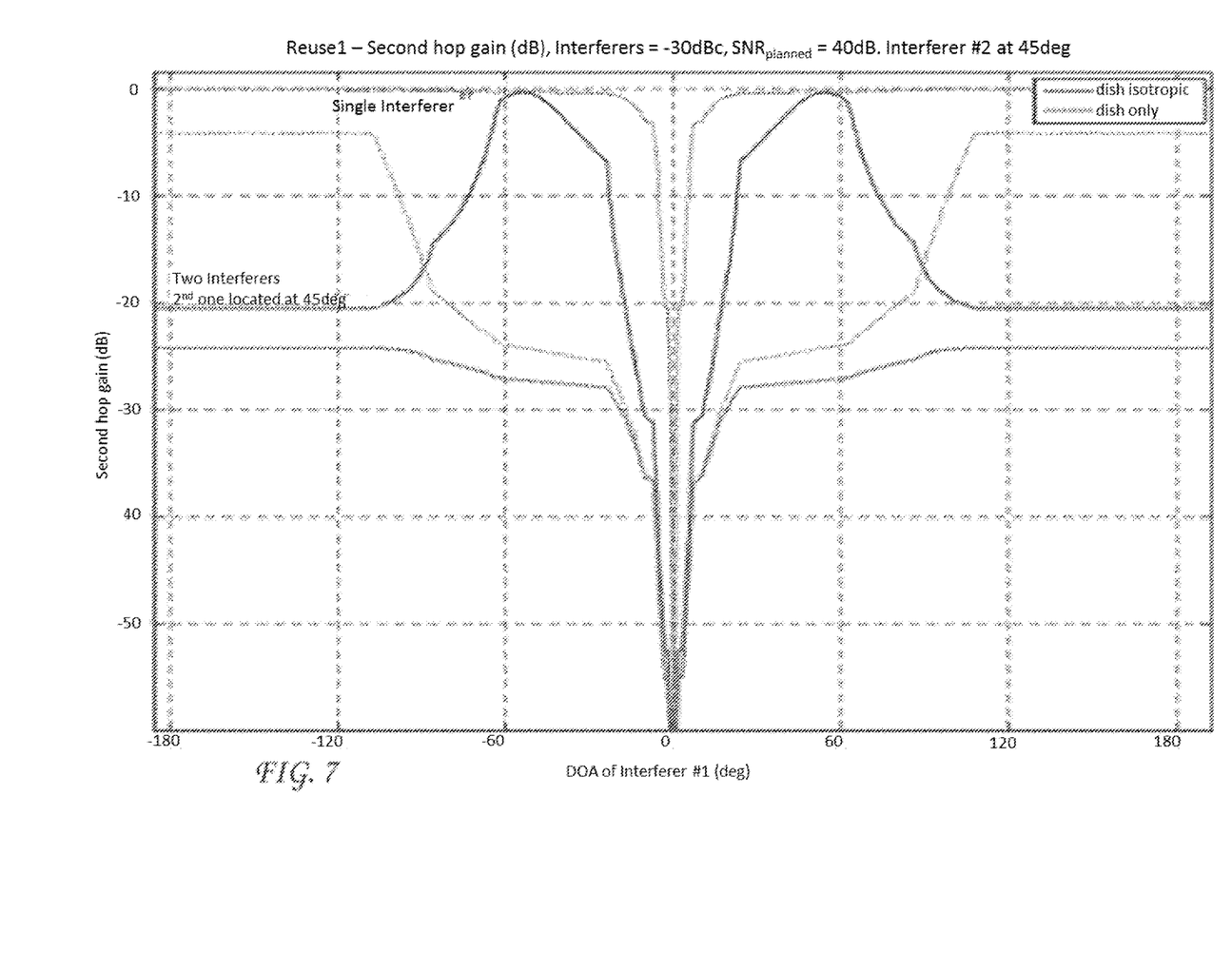
FIG. 7 illustrates the performance in the example presence of two interferers.

The performance in the example presence of two interferers can be depicted as shown in FIG. 7. As illustrated in the example of FIG. 7 only when both interferers are roughly at the same DOA of X (e.g., ~45°) or alternatively one interferer is at X° and the other one is at mirror angle (-X°) then the performance loss, in the case of isotropic assisted cancellation, can be limited to less than 3 dB and it could even reach 0.3 dB. Therefore the cancellation coverage is significantly narrowed down to ±45+(-13.8°) such that loss is less than 3 dB.

Figure 8:
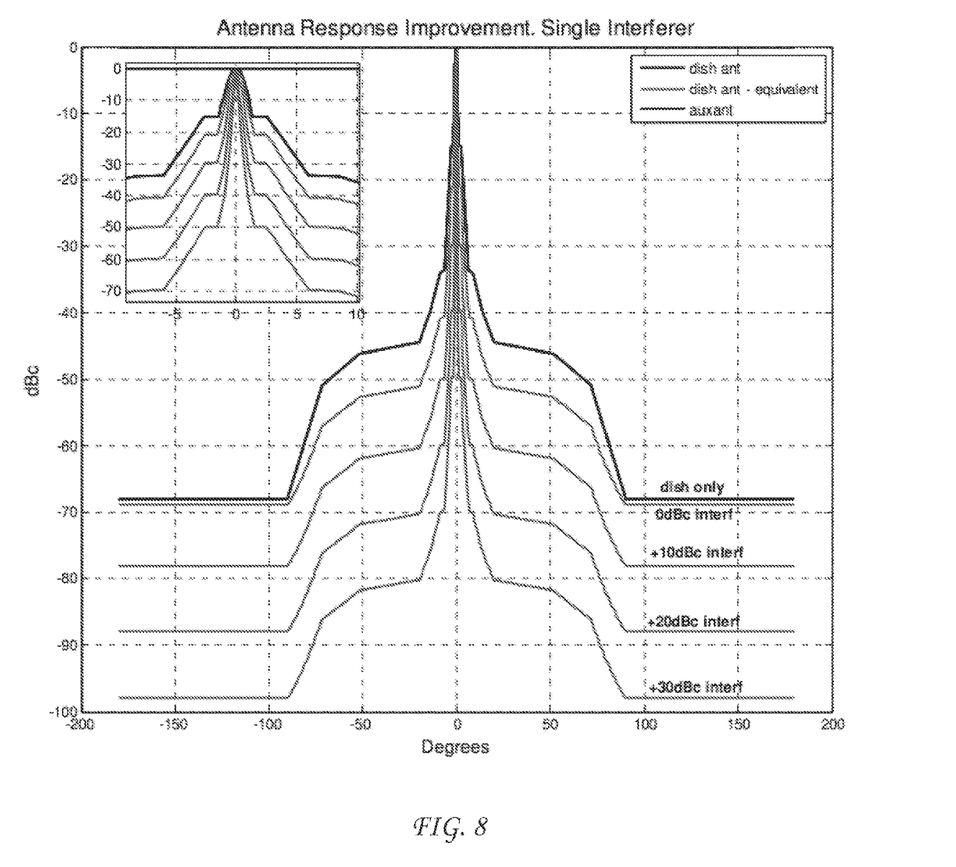
FIG. 8 illustrates an example of antenna response improvement.

The output of the equalizer, specifically for the desired signal $x_2$ will have a significantly improved SNR compared to the case where no auxiliary antenna(s) were used and the dish antenna operated on its own. It can be shown that the overall system of the dish antenna plus one or more auxiliary antennas plus digital baseband processing is equivalent to a significantly (more than 30 dB lower side-lobes) improved (much narrower) single dish antenna response as shown in FIG. 8.

The implication of this solution is that the link-planned SNR can be preserved even in the presence of co-channel strong interferers. This enables operators to significantly reduce spectrum holding yearly fees by sufficing with holding only a single frequency band. It also eases the network frequency planning because such a system is significantly robust of interferers. The number of auxiliary antennas and their type (directional, omni-directional, etc.) is a design parameter and can be traded off at the expense of performance preservation in the main link.

Figure 9:
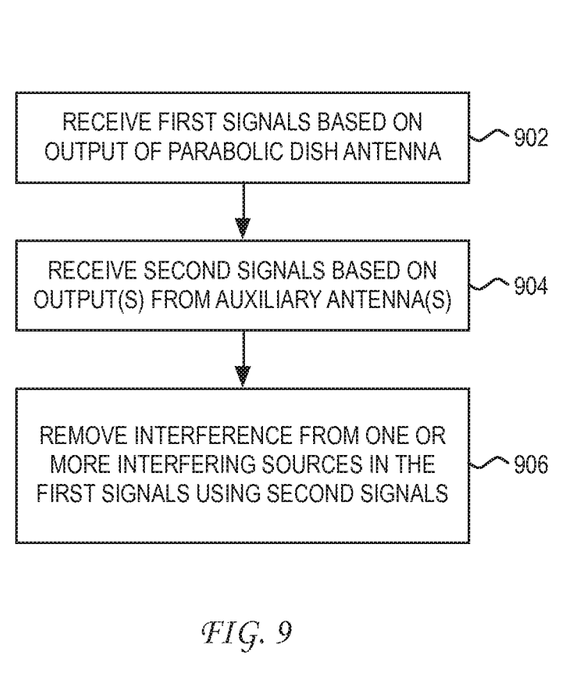
FIG. 9 illustrates a flowchart of an example process.

Having described an equalizer system that complements a parabolic dish antenna with one or more auxiliary antennas, reference is now made to the flowchart of FIG. 9, which illustrates an example process. As illustrated, the process can begin at step 902 where a signal processing module receives first signals based on an output of a parabolic dish antenna. Next, at step 904, the signal processing module receives second signals based on output(s) from one or more auxiliary antennas (e.g., isotropic).

The first signals include a desired signal along with interference generated by one or more interference sources transmitting in the same frequency band as the desired source. In one example, the one or more interference signals are received by the parabolic dish antenna at a DOA that is off the dish antenna's bore-sight and at a lower gain. In contrast, the one or more auxiliary antennas output signal can include an equal gain summation of the desired signal and the interference signal.

At step 906, the signal processing module can then be configured to remove interference from one or more interfering sources n the first signals using the second signals. The cancellation of the interference signals can be performed with a small gain penalty in the desired signal from the desired source. As a result, the relative interference of the one or more interference sources is reduced, thereby enabling greater opportunities for frequency reuse.

A solution has been described based on the example of two interferers and one auxiliary antenna. This example is not intended to be limiting to the scope of the present disclosure. The solution outlined above can be generalized to extend to different numbers of interferers and a different number of auxiliary antennas as would be appreciated.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A microwave receiver system, comprising:
    a parabolic dish antenna that is configured to receive a first plurality of microwave signals from a desired source and generate a dish antenna output, the first plurality of microwave signals comprising interference signals from the desired source and a relayed signal from an intermediate node;
    one or more auxiliary antennas that are configured to receive a second plurality of microwave signals and generate one or more auxiliary antenna outputs, the second plurality of microwave signals comprising a version of the interference signals and a version of the relayed signal; and
    a signal processing module that is configured to receive the dish antenna output and one or more auxiliary antenna outputs, the processing module configured to use the one or more auxiliary antenna outputs to attenuate the interference signals in the dish antenna output.

2. The microwave receiver system of claim 1, comprising an RF module that down-converts the dish antenna output.

3. The microwave receiver system of claim 1, wherein the one or more auxiliary antennas are isotropic antennas.

4. The microwave receiver system of claim 1, wherein the one or more auxiliary antennas is a single auxiliary antenna.

5. The microwave receiver system of claim 1, wherein the one or more auxiliary antennas is a plurality of auxiliary antennas.

6. The microwave receiver system of claim 1, wherein the signal processing module uses a Linear Minimum Mean Square Equalizer technique to remove the interference signals.

7. The microwave receiver system of claim 1, wherein the signal processing module uses a Minimum Mean Square Equalizer technique to remove the interference signals.

8. The microwave receiver system of claim 1, wherein the signal processing module uses a Maximum Likelihood technique to remove the interference signals.

9. A method, comprising:
    generating a dish antenna output from a parabolic dish antenna that is configured to receive a first plurality of microwave signals from a desired source, the first plurality of microwave signals comprising interference signals from the desired source and a relayed signal from an intermediate node;
    generating one or more auxiliary antenna outputs from one or more auxiliary antennas that are configured to receive a second plurality of microwave signals, the second plurality of microwave signals comprising a version of the interference signals and a version of the relayed signal; and
    attenuating, using a signal processing module configured to receive the dish antenna output and the one or more auxiliary antenna outputs, the interference signals in the dish antenna output.

10. The method of claim 9, comprising down-converting the dish antenna output using an RF module.

11. The method of claim 9, wherein the one or more auxiliary antennas are isotropic antennas.

12. The method of claim 9, wherein the one or more auxiliary antennas is a single auxiliary antenna.

13. The method of claim 9, wherein the one or more auxiliary antennas is a plurality of auxiliary antennas.

14. The method of claim 9, wherein the removing comprises removing using a Linear Minimum Mean Square Equalizer technique.

15. The method of claim 9, wherein the removing comprises removing using a Minimum Mean Square Equalizer technique to remove the interference signals.

16. The method of claim 9, wherein the removing comprises removing using a Maximum Likelihood technique to remove the interference signals.

17. A method, comprising:
    receiving, by a signal processing module, an output of a parabolic dish antenna that is configured to receive a first plurality of microwave signals from a desired source, the first plurality of microwave signals comprising interference signals from the desired source and a relayed signal from an intermediate node;
    receiving, by the signal processing module, an output of one or more auxiliary antennas; and attenuating, via the signal processing module, the interference signals in the dish antenna output using the output of one or more auxiliary antennas.

19. The method of claim 17, wherein the one or more auxiliary antennas are isotropic antennas.

19. The method of claim 17, wherein the one or more auxiliary antennas is a single auxiliary antenna.

20. The method of claim 17, wherein the one or more auxiliary antennas is a plurality of auxiliary antennas.

* * * * *